United States Patent
Williams et al.

(10) Patent No.: US 8,682,883 B2
(45) Date of Patent: Mar. 25, 2014

(54) SYSTEMS AND METHODS FOR IDENTIFYING SETS OF SIMILAR PRODUCTS

(75) Inventors: Loren Williams, Decatur, GA (US);
Emir Pasalic, Atlanta, GA (US);
Nikolaos Vasiloglou, Atlanta, GA (US)

(73) Assignee: Predictix LLC, Atlanta, GA (US)

( * ) Notice: Subject to any disclaimer, the term of this patent is extended or adjusted under 35 U.S.C. 154(b) by 39 days.

(21) Appl. No.: 13/448,020

(22) Filed: Apr. 16, 2012

(65) Prior Publication Data

US 2012/0265736 A1 Oct. 18, 2012

Related U.S. Application Data

(60) Provisional application No. 61/475,605, filed on Apr. 14, 2011.

(51) Int. Cl.
*G06F 17/30* (2006.01)

(52) U.S. Cl.
USPC ........... 707/708; 707/703; 707/707; 707/709; 707/710; 707/711; 707/712; 707/713; 707/722; 707/736; 707/758; 707/781

(58) Field of Classification Search
None
See application file for complete search history.

(56) References Cited

U.S. PATENT DOCUMENTS

| | | | |
|---|---|---|---|
| 2003/0236659 A1* | 12/2003 | Castellanos | 704/4 |
| 2005/0060324 A1* | 3/2005 | Johnson et al. | 707/100 |
| 2007/0156516 A1* | 7/2007 | Moissinac et al. | 705/14 |
| 2008/0189262 A1* | 8/2008 | Peng et al. | 707/5 |

* cited by examiner

*Primary Examiner* — Syling Yen
(74) *Attorney, Agent, or Firm* — Morris Manning & Martin LLP; Daniel E. Sineway, Esq.

(57) ABSTRACT

Embodiments of the present invention relate to systems and methods for determining sets of products which are similar to each other in terms of consumers' wants and needs. Queries are performed on a particular product. Documents relating to the query are received and stored. A dictionary is created from the received documents, whereby the documents, which are text files, are scrubbed of certain data to create a scrubbed text file. Topic modeling is then performed on the cleansed text file. Various methods can be used to perform topic modeling, including, but not limited to, latent semantic analysis, nonnegative matrix factorization, and singular value decomposition.

21 Claims, 3 Drawing Sheets

SYSTEMS AND METHODS FOR IDENTIFYING SETS OF SIMILAR PRODUCTS

CROSS-REFERENCE TO RELATED APPLICATIONS

This application claims the benefit of U.S. Provisional Application No. 61/475,605 filed 14 Apr. 2011, the entire contents and substance of which are hereby incorporated by reference.

BACKGROUND

1. Field of the Invention

The present invention generally relates to systems and methods for identifying sets of similar products, and more specifically relates to systems and methods for automatically determining which sets of products are likely to be substitutes.

2. Description of Related Art

A number of retail processes and decisions depend on knowing which products are likely substitutes for other products. These decisions include various forecasting processes which estimate how sales will evolve in response to pricing and promotional changes or in the presence of stockouts. They also include decisions about which products to offer at any point in time, which products to replenish, or which products to offer in the future for planning purposes. By way of example, it can be difficult to identify that Advil and Motrin are similar products by simply relying on the descriptive information in retailer's internal systems for printing shelf tags. Brand names do not always provide information about the content and functionality of a product.

Several approaches can be used to determine possible substitutes. For example, a judgmental approach can be used. In the judgmental approach, business experts associate substitute items with each other. With or without some system support for the process, the experts are asked to assign items to groups of substitutes based on their knowledge of the items and customer behavior. This approach suffers from inconsistencies in knowledge and skill across the company and from practical difficulties of maintaining the information over time.

Another approach can be a statistical approach. In the statistical approach, a model is proposed that relates the quantity sold of one item, e.g. the "target" item, to the pricing or promotional variations for another item, e.g. the "potential substitute". If the former can be shown to be significantly correlated to the latter, then the items are presumed to be substitutes. This approach suffers from its dependence on there being information on historical conditions suitable to test such a model. These conditions include 1) the target item has sufficient history in which the potential substitute does not exhibit price and promotional variations, 2) the price and promotional variations of the potential substitute occur when the target item is available for sale and in stock, and 3) the price and promotional variations of the potential substitute do not correspond closely to price and promotional variations in other potential substitutes (i.e. 'co-promotions').

Even when such conditions are reflected in the data, the nature of retail sales is such that many non-modeled phenomena will affect the sales of the target item, including the fundamental randomness of consumer behavior. The consequence is that, even if the pricing and promotional variations in the potential substitute item do, in fact, influence the sale of the target item, this may not be reflected in the correlation measured by the model, or may not be measured with sufficient confidence to declare that the items are substitutes.

SUMMARY

Briefly described, embodiments of the present invention relate to systems and methods for determining sets of products that may be similar in terms of customer needs or wants. Various embodiments of the present invention can provide for readily identifying sets of items that may be viewed by consumers as similar to each other. One such exemplary use is in processes that employ statistical methods to measure substitution propensities. Using certain embodiments of the present invention, these processes can better able to, by way of example and not by way of limitation, support decisions to set or change prices, to respond to consumer requests for products with alternatives that may be preferable to the customer or to the seller, and to improve sales forecasts of other products when a product is not available for sale. Another exemplary use can be in processes by which retailers determine what products they will offer for sale, in which it is of great value to have in the set of products being considered not only sets of similar products for which the retailer has experience, but also products unfamiliar to the retailer identified as similar by querying product descriptions on the internet. A still further use can be in processes by which retailers replenish their stocks, in which it is of great value to enhance the replenishment logic and rules to substitute a similar product, if a replenishment request cannot be honored due to lack of availability in the retailer's supply chain.

In one exemplary embodiment of the present invention, certain queries are performed on a set of products. Documents relating to the query are received and stored. A dictionary is created from the received documents, whereby the documents, which are text files, are scrubbed of certain data to create a scrubbed text file. Topic modeling is then performed on the cleansed text file. Various methods can be used to perform topic modeling, including, but not limited to, latent semantic analysis, nonnegative matrix factorization, and singular value decomposition.

One exemplary embodiment of the present invention is a computer-implemented method comprising receiving an identification of a product for clustering into one or more sets of similar products, transmitting a query to one or more internet websites or accessible databases having information related to the product, receiving from the one or more internet websites information relevant to the product, merging and storing at least a portion of the received information into one or more databases, transforming at least a portion of the received information into a text file, cleansing at least a portion of the text file to create a cleansed text file, creating a dictionary from at least a portion of the cleansed text file, wherein the dictionary comprises words found in the cleansed text file, and performing topic modeling on the cleansed text file to determine one or more substitutes of the product.

As disclosed, while the present invention can operate/manipulate all data, for example, transforming all of the received information into a text file, it need not completely perform such steps. Thus, in some exemplary embodiments, the present invention merges and stores "at least a portion of" the received information into one or more databases, and/or transforms "at least a portion of" the received information into a text file, and/or cleanses "at least a portion of" the text file to create a cleansed text file, among other exemplary steps.

One of ordinary skill in the art will appreciate that the present invention can provide relevant and beneficial results when it performs steps on less than all the data discussed in each step, and when used herein as acting on all data, it is also understood that a step or feature of a system can act on "at least a portion of" the data.

In another exemplary embodiment, the present invention is a computer-implemented method comprising receiving an identification of a product for clustering into one or more sets of similar products, transmitting a query to one or more internet websites having information related to the product, receiving from the one or more internet websites information relevant to the product, merging and storing the received information into one or more databases, transforming received information into a text file, cleansing the text file to create a cleansed text file, creating a dictionary from the cleansed text file, wherein the dictionary comprises all words found in the cleansed text file, and performing topic modeling on the cleansed text file.

In yet another exemplary embodiment is a non-transitory computer-readable medium having software instructions stored thereon, which, when executed by a client device, causes the client device to perform the operations comprising receiving an identification of a product for clustering into one or more sets of similar products, transmitting a query to one or more internet websites having information related to the product, receiving from the one or more internet websites information relevant to the product, merging and storing the received information into one or more databases, transforming all received information into a text file, cleansing the text file to create a cleansed text file, creating a dictionary from the cleansed text file, wherein the dictionary comprises all words found in the cleansed text file, and performing topic modeling on the cleansed text file.

A further embodiment of the present invention is a system for topic modeling, comprising a client computer comprising a processor configured to execute computer-executable instructions, the instructions comprising instructions for receiving an identification of a product for clustering into one or more sets of similar products, transmitting a query to one or more internet websites having information related to the product, receiving from the one or more internet websites information relevant to the product, merging and storing the received information into one or more databases, transforming all received information into a text file, cleansing the text file to create a cleansed text file, creating a dictionary from the cleansed text file, wherein the dictionary comprises all words found in the cleansed text file, and performing topic modeling on the cleansed text file to determine one or more substitutes of the product. The system further comprises a database for storing the text file, the cleansed text file, and the dictionary.

Further features of embodiments of the present invention, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and furthermore, are not intended in any manner to limit the scope of the presently disclosed subject matter.

DETAILED DESCRIPTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent are intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The present invention discloses methods and systems for determining which sets of products are likely to be substitutes of each other by applying one of a plurality of machine learning algorithms to the descriptive information available on product websites. For example, a situation may be that while a retailer is engaged with a customer, and by learning her needs, the retailer may wish to present several alternatives to the customer to increase the likelihood that the customer will purchase something. These alternatives, or substitutes, could be presented by the retailer on its website if the customer is shopping via the internet, or, could be presented in person in the store. The present invention can permit a retailer to create and effectively manage sets of similar products which can be readily accessed for this purpose.

Another example situation can be that the retailer may wish to recommend one particular product from the set of similar products, which can be the product best suited to the customer's needs, as discerned by the retailer, or can be the product which provides the highest profit or expected profit to the retailer. Often, retailers allocate certain budgets for the purposes of promotions, advertising or other marketing of categories or products. The present invention permits the retailer to create and effectively manage sets of similar products which can be readily accessed for this purpose.

An Internet query can return relevant website information either from the manufacturer, rating sites, or e-commerce sites. This information can be collected into documents, and the problem of clustering like products can be cast as a document clustering problem (also known as 'topic modeling' in the data mining community). There are a number of techniques suitable for clustering documents, including Latent Semantic Analysis, NonNegative Matrix Factorization and Singular Value Decomposition.

Figure 1:
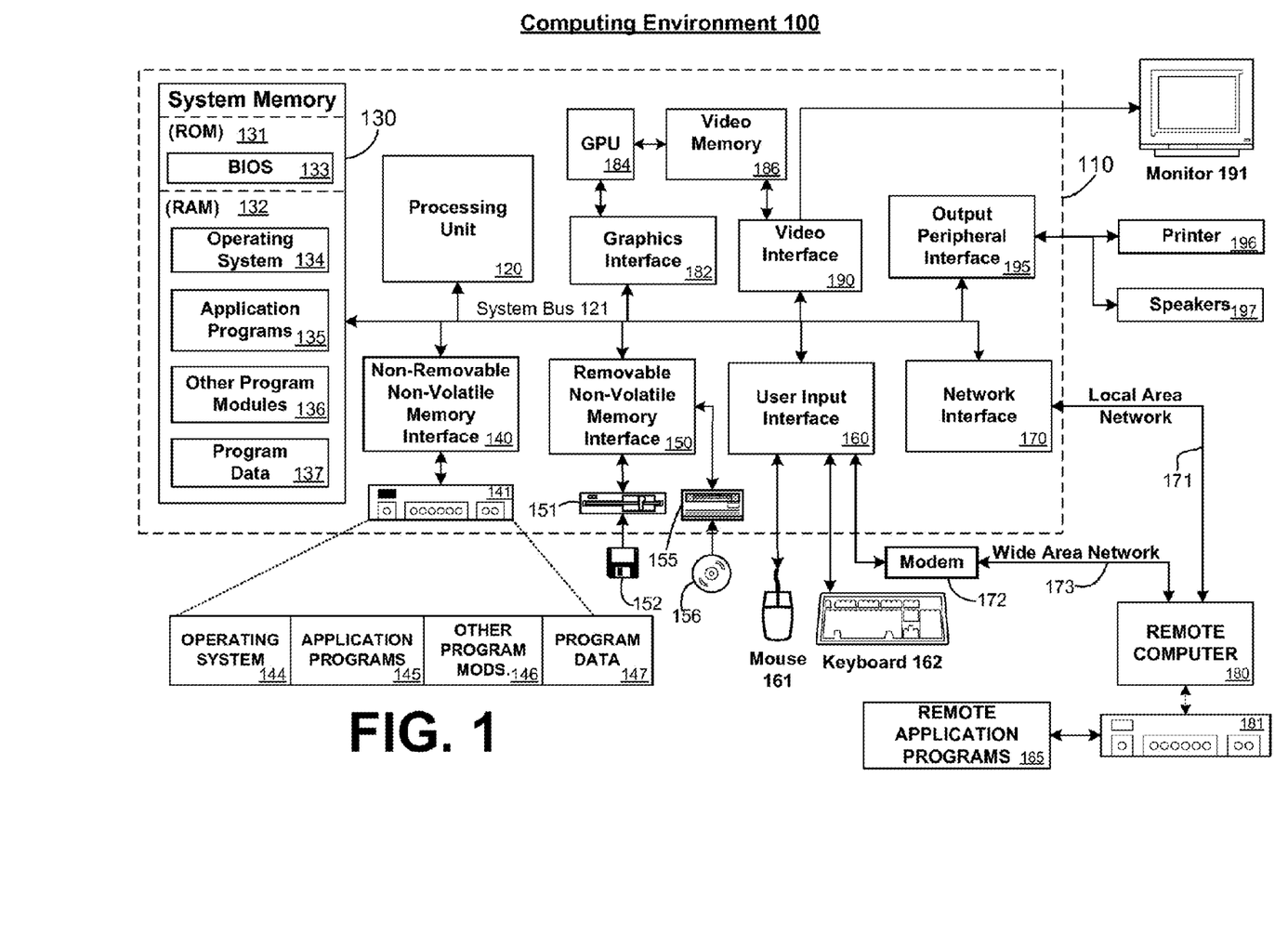
FIG. 1 illustrates an exemplary computer for topic modeling, according to an exemplary embodiment of the present invention.

FIG. 1 and the following discussion are intended to provide a brief general description of a suitable computing environment in which various embodiments of the present invention can be implemented. It should be understood that handheld, portable, and other computing devices of all kinds are contemplated for use in connection with the present invention. While a general purpose computer is described below, this is but one example. Thus, the present invention can be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types.

Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like.

Various embodiments of the present invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention can be implemented, although as made clear above, the computing system environment 100 is only one example of a suitable computing environment and is not intended to suggest any limitation as to the scope of use or functionality of the invention. Computing environment 100 should not be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 can include, but are not limited to, a processing unit 120, a system memory 130, and a system bus 121 that couples various system components including the system memory to the processing unit 120. The system bus 121 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express.

Computer 110 typically includes a variety of computer readable media. Computer readable media can be any available media that can be accessed by computer 110 and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, optical, phased-array antenna operating at any wavelength, directional and non-directional electromagnetic emitters and receivers operating at any wavelength, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 can also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user can enter commands and information into the computer 110 through input devices such as a keyboard 162 and pointing device 161, commonly referred to as a mouse, trackball or touch pad. Other input devices (not shown) can include a microphone, joystick, game pad, satellite dish, scanner, or the like. These and other input devices are often connected to the processing unit 120 through a user input interface 160 that is coupled to the system bus 121, but can be connected by other interface and bus structures, such as a parallel port, game port or a universal serial bus (USB).

A monitor 191 or other type of display device is also connected to the system bus 121 via an interface, such as a video interface 190. A graphics interface 182 can also be connected to the system bus 121. The chipset can communicate with the CPU, or host processing unit 120, and assume responsibility for accelerated graphics port (AGP) communications. One or more graphics processing units (GPUs) 184 can communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices can be included in computer 110. A monitor 191 or other type of display device is also connected to the system bus 121 via an interface, such as a video interface 190, which can in turn communicate with video memory 186. In addition to monitor 191, computers can also include other peripheral output devices such as speakers 197 and printer 196, which can be connected through an output peripheral interface 195.

The computer 110 can operate in a networked environment using logical connections to one or more remote computers, such as a remote computer 180. The remote computer 180 can be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but can also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which can be internal or external, can be connected to the system bus 121 via the user input interface 160, or other appropriate mechanism. In a networked environment, program modules depicted relative to the computer 110, or portions thereof, can be stored in the remote memory storage device. By way of example, and not limitation, FIG. 1 illustrates remote application programs 185 as residing on memory device 181. It will be appreciated that the network connections shown are exemplary and other means of establishing a communications link between the computers can be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention can apply to an environment with server computers and client computers deployed in a network environment, having remote or local storage. The present invention can also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices can have applications, objects or resources that can interact to implicate authentication techniques of the present invention for trusted graphics pipeline(s).

Figure 2:
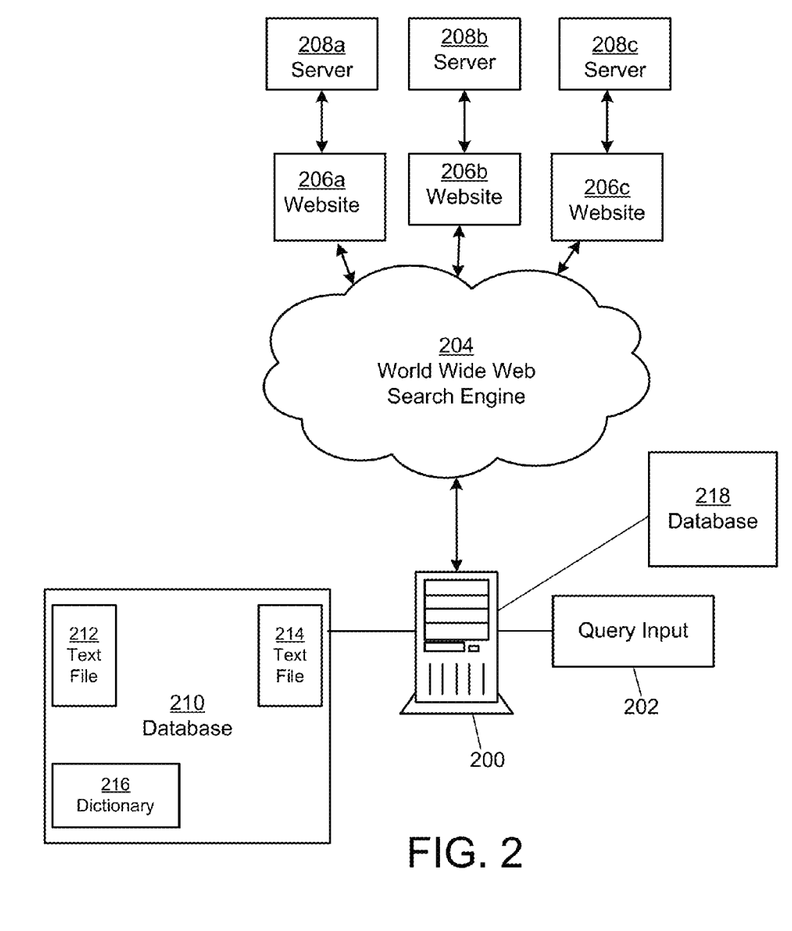
FIG. 2 illustrates an exemplary system for topic modeling, according to an exemplary embodiment of the present invention.

FIG. 2 illustrates an exemplary system that can be used to implement various embodiments of the present invention. Client computer 200 can receive an inquiry via query input device 202. Query input device 202 can be a local search computer or can be a remote search computer. For example, a user (not shown) can input a query to client computer 200 via query input device 202 remotely through the Internet or locally. In a still further example, the present invention can be an application loaded onto the user's computer, thus transforming the user's computer into client computer 200. In an alternate embodiment, a remote system can be accessible via Internet communications, as can be found in a computing environment known as a "Software-as-a-Service" or SAAS.

Various embodiments of the present invention are directed to providing a user with information regarding possible substitutes to a particular product or service. The query can take various forms including queries from consumers interested in finding substitutes to a particular product. Client computer 200 transmits a query to one or more Internet websites 206a-c via worldwide web Internet search engine 204. Internet search engine 204 queries Internet websites 206a-c to determine if information relevant to the query is contained in the applicable server for each website, servers 208a-c respectively. It should be noted that the queries can be directed to other sources of information, including, but not limited to, electronic databases accessible via the Internet or other form of electronic communication. It should further be noted that the present invention is not limited to queries transmitted to external databases. By way of example, and not by way of limited, computer 200 can transmit a query to internal database 218. Database 218 can be configured to either perform a search function for the relevant information or can be prepopulated with information relevant to the query. Additionally, the present invention is not limited to the use of discrete databases, such as database 218 and database 210, but rather, and not by way of limitation, can be used on one database or multiple databases. Further, it should be noted that the present invention is not limited to client computer 200 receiving a query from an external source, as other ways and methods can be employed to cause client computer 200 to query databases, including, but not limited to, automatic internal processes that generate queries based on one or more factors. For example, a query can be generated based on stocking levels of a company using the present invention.

If relevant information is contained in one or more of websites 206*a-c*, the information is transmitted from websites 206*a-c* to client computer 200 and stored in database 210. Database 210 can be one or more databases in communication with each other. Once the information is received and stored in database 210, the information is transformed into text file 212. Text file 212 can be stored in database 210 or can be stored in one or more other databases.

In order to perform a topic modeling function on text file 212, text file 212 is cleansed of certain information. For example, text file 212 can contain HTML tags, metadata, punctuation, and numbers. Text file 212 is scrubbed to produce cleansed text file 214, which can be stored in the same database or in one or more local or remote databases. Dictionary 216 is created from cleansed text file 214 and can be stored in database 210 or in one or more local or remote databases. Dictionary 216 can comprise the words found in cleansed text file 214.

Once dictionary 216 is created, client computer 200 performs topic modeling on the contents of the dictionary 216. A topic model is a type of statistical model for discovering the abstract "topics" that occur in a collection of documents. One type of topic modeling is latent semantic indexing. Other statistical methods for discovering abstract "topics" can also be used and are considered to be within the scope of the present invention, including, but not limited to, nonnegative matrix factorization and singular value decomposition.

Figure 3:
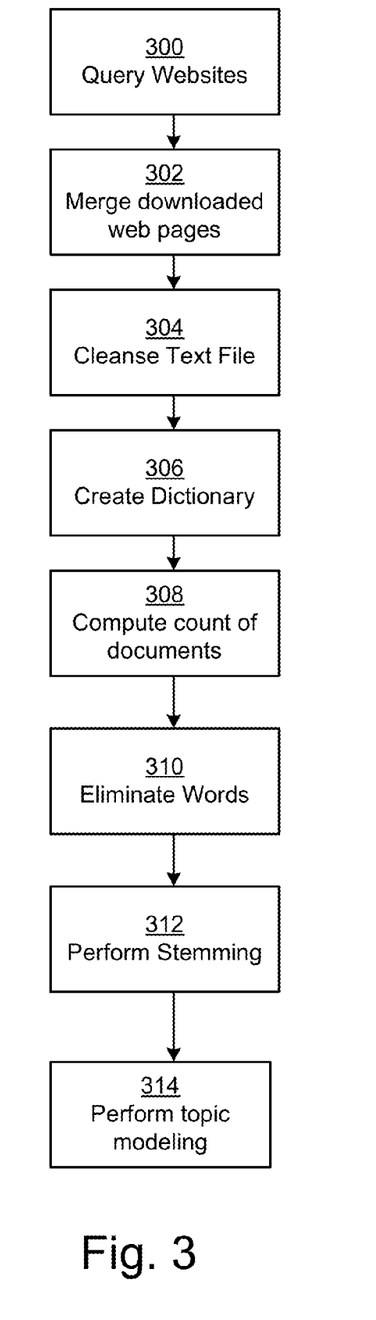
FIG. 3 is an exemplary method for performing topic modeling, according to an exemplary embodiment of the present invention.

FIG. 3 is an exemplary method according to various embodiments of the present invention. For every product under consideration for clustering into sets of like products, a first step 300 queries one or more websites or internal databases that might contain relevant information and downloads the web pages or database results. In a second step 302, merge all downloaded web pages or query results for that product into a single text file. Once the pages are downloaded and merged, in a step 304, the text file is cleansed by removing HTML tags and other metadata, punctuation, numbers, and converting everything to lower case. Then, at step 306, a dictionary is created from all of the cleansed text files, comprising all words found in the text files. After the dictionary is created, step 308 computes the count of documents in which each word makes an appearance, and then step 310 eliminates words that appear very frequently and very rarely from the dictionary. For all words in the dictionary, step 312 stems the words, and adds the stemmed words to the dictionary. Once the stemmed words are added to the dictionary, step 314 performs topic modeling. An exemplary method for topic modeling can be singular value decomposition, which comprises computing the count of documents in which each stemmed word makes an appearance.

For each word in the dictionary, compute a weight (w) as:

$$w = \log\left[\frac{\text{total number of documents}}{\text{Documents in which the word appears}}\right]$$

Other types of weight computation methods may be employed and are considered to be within the scope of the present invention. Another exemplary weight computation may be $W=1/(\text{documents in which the word appears})$.

Once the dictionary is modified, an exemplary next step can be to convert the dictionary to a (sparse) m×p matrix, where m is the number of documents (or products) and p is the number of words. Each entry in the matrix is the count of each corresponding word multiplied by its weight. Then, perform Singular Value Decomposition on this matrix. It should be noted that other types of decomposition methods may be used along with other clustering or dimensionality reduction methods, which also may be known as low rank factorizations, and all are considered to be within the scope of the present invention. Some methods include, but are not limited to, Nonnegative Matrix Factorization, Probabilistic Latent Semantic Analysis, Low Rank Factorization via Nuclear Norm Minimization, Local Linear Embedding, Isomap, Maximum Variance Unfolding, SVD++, and Randomized SVD.

Each document (or product) is now represented by its corresponding row of the left singular vectors (eigenvectors). The rows of the right singular vector (eigenvectors) represent the clusters of like products. The cluster to which each product belongs is found by projecting the sparse p-dimensional vector corresponding to its document onto each of the right eigenvectors representing the clusters. The projection which produces the maximum value identifies that product's cluster. The reliability of the clusters identified by various methods disclosed above can be improved using various robustness algorithms, in which one of the non-deterministic factorization methods, such as, but not limited to Nonnegative Matrix Factorization, Probabilistic Latent Semantic Analysis, and Randomized SVD, is executed multiple times. For every product, the products in its cluster can be recorded without removing duplicates. Then, the frequency of every cluster member across the multiple executions is recorded. Only products for which the frequency exceeds some threshold are identified as belonging to the cluster.

It should be noted that by representing each product by the low-dimensional eigenvector (step 312) the invention permits a plurality of other methods for deriving clusters of similar products. One such alternative is to apply a nearest-neighbor algorithm to determine which vectors are closest in Euclidean space, and hence represent the most similar products. Exact nearest-neighbor algorithms can be performed with kd-trees and the dual tree algorithm, by way of example and not by way of limitation. Approximate nearest neighbors can also be found with spill-trees or with locally sensitive hashing.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications can be made without departing from the subject matter described herein and its broader aspects and, therefore, the appended claims are to encompass within their scope all such changes and modifications as are within the true spirit and scope of the subject matter described herein.

What is claimed is:

1. A computer-implemented method comprising:
   receiving an identification of a product for clustering into one or more sets of similar products;
   transmitting a query to one or more information sources having information related to the product;
   receiving from the one or more internet websites information relevant to the product;
   merging and storing at least a portion of the received information into one or more databases;
   transforming at least a portion of the received information into a text file;
   cleansing at least a portion of the text file to create a cleansed text file;
   creating a dictionary from at least a portion of the cleansed text file, wherein the dictionary comprises words found in the cleansed text file;
   performing topic modeling on the cleansed text file to determine one or more clusters of one or more substitutes of the product, further comprising the steps of:
      computing a count of documents in which a word in the cleansed text file appears; and
      deleting one or more words that appear at a predetermined frequency from the dictionary; and
   computing a weight calculated by $$w = \log\left[\frac{\text{total number of documents}}{\text{Documents in which the word appears}}\right]$$

wherein w is the "weight".

2. The method of claim 1, wherein the information sources are selected from the group consisting of an Internet website or a database.

3. The method of claim 1, wherein transforming at least a portion of the received information into a text file comprises transforming all of the received information into a text file.

4. The method of claim 1, wherein cleansing at least a portion of the text file to create a cleansed text file comprises cleansing the entire text file to create a cleansed text file.

5. The method of claim 1, wherein creating a dictionary from at least a portion of the cleansed text file, wherein the dictionary comprises words found in the cleansed text file comprises creating a dictionary from the entire cleansed text file, wherein the dictionary comprises all words found in the cleansed text file.

6. The method of claim 1, wherein cleansing at least a portion of the text file to create a cleansed text file comprises scrubbing the text file of data selected from the group consisting of HTML tags, metadata, punctuation, and numbers.

7. The method of claim 6 further comprising converting the non-scrubbed data comprising alphanumeric characters to lower case characters.

8. The method of claim 1, wherein performing topic modeling on the cleansed text file to determine one or more substitutes of the product is selected from the group consisting of latent semantic analysis, nonnegative matrix factorization, and singular value decomposition.

9. The method of claim 1 further comprising: stemming at least a portion of the non-deleted words;
   adding at least a portion of the stemmed words to the dictionary; and
   computing a count of documents in which one or more stemmed word appears.

10. The method of claim 9 further comprising:
    converting the dictionary to a sparse m.times.p matrix, where m is a number of documents and p is the number of words, wherein each entry in the matrix is the count of each corresponding word multiplied by the weight; and
    performing Singular Value Decomposition on the matrix, wherein each document is represented by its corresponding row of the left singular vectors (eigenvectors), wherein the rows of the right singular vector (eigenvectors) represent the one or more clusters of one or more substitutes of the product;
    wherein a cluster of the one or more clusters to which each product belongs is found by projecting the sparse p-dimensional vector corresponding to its document onto each of the right eigenvectors representing the one or more clusters, wherein the projection which produces the maximum value identifies the product's cluster.

11. The method of claim 1, wherein performing topic modeling on the cleansed text file is performed multiple times to increase the reliability of the one or more clusters.

12. A non-transitory computer-readable medium having software instructions stored thereon, which, when executed by a client device, causes the client device to perform the operations comprising:
    receiving an identification of a product for clustering into one or more sets of similar products;
    transmitting a query to one or more internet websites having information related to the product;
    receiving from the one or more internet websites information relevant to the product;
    merging and storing the received information into one or more databases;
    transforming all received information into a text file;
    cleansing the text file to create a cleansed text file;
    creating a dictionary from the cleansed text file, wherein the dictionary comprises all words found in the cleansed text file;
    performing topic modeling on the cleansed text file to determine a cluster of one or more substitutes of the product, further comprising the steps of:
       computing a count of documents in which a word in the cleansed text file appears; and
       deleting one or more words that appear at a predetermined frequency from the dictionary; and
    computing a weight calculated by $$w = \log\left[\frac{\text{total number of documents}}{\text{Documents in which the word appears}}\right]$$

wherein w is the "weight".

13. The non-transitory computer-readable medium of claim 12, wherein cleansing the text file to create a cleansed text file comprises scrubbing the text file of data selected from the group consisting of HTML tags, metadata, punctuation, and numbers.

14. The non-transitory computer-readable medium of claim 13, further comprising converting the non-scrubbed data comprising alphanumeric characters to lower case characters.

15. The non-transitory computer-readable medium of claim 12, wherein the method for performing topic modeling on the cleansed file is selected from the group consisting of latent semantic analysis, nonnegative matrix factorization, and singular value decomposition.

16. The non-transitory computer-readable medium of claim 12 further comprising:
  perform stemming on the non-deleted words;
  adding the stemmed words to the dictionary; and
  computing a count of documents in which each stemmed word appears.

17. The non-transitory computer-readable medium of claim 16 further comprising:
  converting the dictionary to a sparse m.times.p matrix, where m is a number of documents and p is the number of words, wherein each entry in the matrix is the count of each corresponding word multiplied by the weight; and
  performing Singular Value Decomposition on the matrix, wherein each document is represented by its corresponding row of the left singular vectors (eigenvectors), wherein the rows of the right singular vector (eigenvectors) represent the one or more clusters of one or more substitutes of the product;
  wherein a cluster of the one or more clusters to which each product belongs is found by projecting the sparse p-dimensional vector corresponding to its document onto each of the right eigenvectors representing the one or more clusters, wherein the projection which produces the maximum value identifies that product's cluster.

18. A system for topic modeling comprising:
  a client computer comprising a processor configured to execute computer-executable instructions, the instructions comprising instructions for:
  receiving an identification of a product for clustering into one or more sets of similar products;
  transmitting a query to one or more internet web sites having information related to the product;
  receiving from the one or more internet websites information relevant to the product;
  merging and storing at least a portion of the received information into one or more databases;
  transforming at least a portion of the received information into a text file;
  cleansing at least a portion of the text file to create a cleansed text file;
  creating a dictionary from at least a portion of the cleansed text file, wherein the dictionary comprises words found in the cleansed text file;
  performing topic modeling on the cleansed text file to determine one or more substitutes of the product, further comprising of:
    computing a count of documents in which a word in the cleansed text file appears;
    deleting one or more words that appear at a predetermined frequency from the dictionary; and
    computing a weight calculated by $$w = \log\left[\frac{\text{total number of documents}}{\text{Documents in which the word appears}}\right]$$

wherein w is the "weight"; and a database for storing:
  the text file;
  the cleansed text file; and
  the dictionary.

19. A computer-implemented method comprising:
  receiving an identification of a product for clustering into one or more sets of similar products;
  transmitting a query to one or more information sources having information related to the product;
  receiving from the one or more internet websites information relevant to the product;
  merging and storing at least a portion of the received information into one or more databases;
  transforming at least a portion of the received information into a text file;
  cleansing at least a portion of the text file to create a cleansed text file;
  creating a dictionary from at least a portion of the cleansed text file, wherein the dictionary comprises words found in the cleansed text file;
  performing topic modeling on the cleansed text file to determine one or more clusters of one or more substitutes of the product;
  performing topic modeling on the cleansed text file to determine one or more substitutes of the product;
  stemming at least a portion of the non-deleted words;
  adding at least a portion of the stemmed words to the dictionary;
  computing a count of documents in which one or more stemmed word appears;
  converting the dictionary to a sparse m.times.p matrix, where m is a number of documents and p is the number of words, wherein each entry in the matrix is the count of each corresponding word multiplied by the weight; and
  performing Singular Value Decomposition on the matrix, wherein each document is represented by its corresponding row of the left singular vectors (eigenvectors), wherein the rows of the right singular vector (eigenvectors) represent the one or more clusters of one or more substitutes of the product;
  wherein a cluster of the one or more clusters to which each product belongs is found by projecting the sparse p-dimensional vector corresponding to its document onto each of the right eigenvectors representing the one or more clusters, wherein the projection which produces the maximum value identifies the product's cluster.

20. A non-transitory computer-readable medium having software instructions stored thereon, which, when executed by a client device, causes the client device to perform the operations comprising:
  receiving an identification of a product for clustering into one or more sets of similar products;
  transmitting a query to one or more internet websites having information related to the product;
  receiving from the one or more internet websites information relevant to the product;
  merging and storing the received information into one or more databases;
  transforming all received information into a text file;
  cleansing the text file to create a cleansed text file;
  creating a dictionary from the cleansed text file, wherein the dictionary comprises all words found in the cleansed text file;
  performing topic modeling on the cleansed text file to determine one or more substitutes of the product;
  perform stemming on the non-deleted words;
  adding the stemmed words to the dictionary;

computing a count of documents in which each stemmed word appears;

converting the dictionary to a sparse m.times.p matrix, where m is a number of documents and p is the number of words, wherein each entry in the matrix is the count of each corresponding word multiplied by the weight; and performing Singular Value Decomposition on the matrix, wherein each document is represented by its corresponding row of the left singular vectors (eigenvectors), wherein the rows of the right singular vector (eigenvectors) represent the one or more clusters of one or more substitutes of the product;

wherein a cluster of the one or more clusters to which each product belongs is found by projecting the sparse p-dimensional vector corresponding to its document onto each of the right eigenvectors representing the one or more clusters, wherein the projection which produces the maximum value identifies that product's cluster.

21. A system for topic modeling comprising:

a client computer comprising a processor configured to execute computer-executable instructions, the instructions comprising instructions for:

receiving an identification of a product for clustering into one or more sets of similar products;

transmitting a query to one or more internet web sites having information related to the product;

receiving from the one or more internet websites information relevant to the product;

merging and storing at least a portion of the received information into one or more databases;

transforming at least a portion of the received information into a text file;

cleansing at least a portion of the text file to create a cleansed text file;

creating a dictionary from at least a portion of the cleansed text file, wherein the dictionary comprises words found in the cleansed text file;

performing topic modeling on the cleansed text file to determine one or more substitutes of the product;

stemming at least a portion of the non-deleted words;

adding at least a portion of the stemmed words to the dictionary;

computing a count of documents in which one or more stemmed word appears;

converting the dictionary to a sparse m.times.p matrix, where m is a number of documents and p is the number of words, wherein each entry in the matrix is the count of each corresponding word multiplied by the weight; and performing Singular Value Decomposition on the matrix, wherein each document is represented by its corresponding row of the left singular vectors (eigenvectors), wherein the rows of the right singular vector (eigenvectors) represent the one or more clusters of one or more substitutes of the product;

wherein a cluster of the one or more clusters to which each product belongs is found by projecting the sparse p-dimensional vector corresponding to its document onto each of the right eigenvectors representing the one or more clusters, wherein the projection which produces the maximum value identifies that product's cluster; and a database for storing:
the text file;
the cleansed text file; and
the dictionary.

* * * * *